US008589886B2

(12) United States Patent
Lavie et al.

(10) Patent No.: US 8,589,886 B2
(45) Date of Patent: Nov. 19, 2013

(54) SYSTEM AND METHOD FOR AUTOMATIC HARDWARE AND SOFTWARE SEQUENCING OF COMPUTER-AIDED DESIGN (CAD) FUNCTIONALITY TESTING

(75) Inventors: Eitan Lavie, Tel-Aviv (IL); Assaf Tamir, Kirlat-Ono (IL); Moshe Moskovitch, Ezer (IL)

(73) Assignee: Qualisystems Ltd., Ganey-Tikva (IL)

( * ) Notice: Subject to any disclaimer, the term of this patent is extended or adjusted under 35 U.S.C. 154(b) by 271 days.

(21) Appl. No.: 13/002,985

(22) PCT Filed: Jul. 7, 2009

(86) PCT No.: PCT/IL2009/000678
§ 371 (c)(1),
(2), (4) Date: Jan. 7, 2011

(87) PCT Pub. No.: WO2010/004557
PCT Pub. Date: Jan. 14, 2010

(65) Prior Publication Data
US 2011/0112790 A1    May 12, 2011

Related U.S. Application Data

(60) Provisional application No. 61/129,566, filed on Jul. 7, 2008.

(51) Int. Cl.
*G06F 9/44* (2006.01)
*G01R 15/00* (2006.01)
*G01D 3/00* (2006.01)
*G01R 27/28* (2006.01)
*G06F 15/00* (2006.01)
*G06F 7/60* (2006.01)
*G06F 17/10* (2006.01)
*G06F 11/00* (2006.01)
*G06F 9/00* (2006.01)

(52) U.S. Cl.
USPC ........... 717/124; 717/106; 717/125; 717/126; 702/57; 702/108; 702/118; 702/119; 702/120; 702/123; 703/2; 713/1; 714/38

(58) Field of Classification Search
None
See application file for complete search history.

(56) References Cited

U.S. PATENT DOCUMENTS 5,371,851 A    12/1994   Pieper et al.
5,577,052 A    11/1996   Morris
(Continued)

FOREIGN PATENT DOCUMENTS

EP          0242131           3/1995
WO     WO2005114240         12/2005
(Continued)

OTHER PUBLICATIONS

Dimitirs Gizopoulos et al., Processor Testing Techniques, 2004, [Retrieved on Jul. 1, 2013]. Retrieved from the internet: <URL: http://link.springer.com/content/pdf/10.1007%2F978-1-4020-2801-4_4.pdf> 25 Pages (55-78).*

(Continued)

*Primary Examiner* — Don Wong
*Assistant Examiner* — Anibal Rivera
(74) *Attorney, Agent, or Firm* — Graeser Associates International Inc; Dvorah Graeser

(57) ABSTRACT

The present invention relates to a system and a method for creating hardware and/or software test sequences and in particular, to such a system and method in which modular building blocks are used to create, sequence and schedule a large scale testing sequence using a matrix like platform.

24 Claims, 12 Drawing Sheets

(56) References Cited

U.S. PATENT DOCUMENTS

| | | | |
|---|---|---|---|
| 5,910,895 | A | 6/1999 | Proskauer et al. |
| 6,128,759 | A | 10/2000 | Hansen |
| 6,148,277 | A | 11/2000 | Asava et al. |
| 6,401,220 | B1 | 6/2002 | Grey et al. |
| 6,542,841 | B1 | 4/2003 | Snyder |
| 6,675,339 | B1 | 1/2004 | Lanier et al. |
| 6,698,012 | B1 * | 2/2004 | Kossatchev et al. ........... 717/126 |
| 6,785,805 | B1 * | 8/2004 | House et al. ........................ 713/1 |
| 6,961,871 | B2 | 11/2005 | Danialy et al. |
| 6,976,222 | B2 | 12/2005 | Sojoodi et al. |
| 7,058,857 | B2 | 6/2006 | Dallin |
| 7,184,917 | B2 * | 2/2007 | Pramanick et al. ........... 702/120 |
| 7,272,753 | B2 | 9/2007 | Kaplan et al. |
| 8,219,349 | B1 * | 7/2012 | Schwarz et al. .............. 702/118 |
| 2001/0024211 | A1 * | 9/2001 | Kudukoli et al. ............. 345/763 |
| 2002/0055826 | A1 * | 5/2002 | Wegerich et al. ................. 703/2 |
| 2002/0124042 | A1 * | 9/2002 | Melamed et al. ........... 709/102 |
| 2002/0157053 | A1 | 10/2002 | Chen et al. |
| 2003/0182075 | A1 | 9/2003 | Sutton et al. |
| 2003/0182601 | A1 | 9/2003 | Richardson |
| 2004/0093180 | A1 * | 5/2004 | Grey et al. .................... 702/123 |
| 2004/0143819 | A1 * | 7/2004 | Cheng et al. ................. 717/125 |
| 2004/0181355 | A1 * | 9/2004 | Liu et al. ....................... 702/108 |
| 2004/0225459 | A1 * | 11/2004 | Krishnaswamy et al. ...... 702/57 |
| 2006/0230318 | A1 * | 10/2006 | Grey ............................... 714/38 |
| 2007/0006188 | A1 | 1/2007 | Schroth et al. |
| 2007/0016829 | A1 | 1/2007 | Subramanian et al. |
| 2007/0038890 | A1 | 2/2007 | El Far et al. |
| 2007/0150859 | A1 * | 6/2007 | Kodosky et al. .............. 717/106 |
| 2007/0220342 | A1 | 9/2007 | Vieira et al. |
| 2007/0234127 | A1 | 10/2007 | Nguyen |
| 2007/0257693 | A1 | 11/2007 | Stott et al. |
| 2008/0040708 | A1 | 2/2008 | Blancha et al. |
| 2008/0065941 | A1 | 3/2008 | Lammel et al. |
| 2009/0037132 | A1 * | 2/2009 | Zhou et al. .................... 702/119 |

FOREIGN PATENT DOCUMENTS

| | | |
|---|---|---|
| WO | WO2007031415 | 3/2007 |
| WO | WO2007099058 | 9/2007 |
| WO | WO2008008773 | 1/2008 |

OTHER PUBLICATIONS

International Search Report for PCT/IL2009/000678 dated Nov. 4, 2009.

Baroth Ed et al, 1999, An Evaluation of LabVIEW 5.0 and HP VEE 5.0 Part 1 and 2, EE Evaluation Engineering.

HPVEE (Visual Engineering Environment), Hewlett Packard Co. HP Publication No. 5965-6488E; 1997.

Greenbaum Steven et al, 1998, A Compiler for HP VEE, The Hewlett-Packard Journal; Article 13.

* cited by examiner

SYSTEM AND METHOD FOR AUTOMATIC HARDWARE AND SOFTWARE SEQUENCING OF COMPUTER-AIDED DESIGN (CAD) FUNCTIONALITY TESTING

CROSS-REFERENCE TO RELATED APPLICATIONS

This application is the U.S. national phase application of PCT International Application No. PCT/IL2009/000678, filed on 7 Jul. 2009, which claims the benefit of U.S. Provisional Application Ser. No. 61/129,566, filed on 7 Jul. 2008, all of which are hereby incorporated by reference in their entirety.

FIELD OF THE INVENTION

The present invention relates to a system and a method for managing and editing functional test creation and execution by using an automated standardized systems and methods as part of an overall quality management solution. In particular, to such a system and method in which modular building blocks are used to create, sequence, coordinate and schedule automated procedures, for example hardware and or software test sequences, using a matrix like testing platform.

BACKGROUND OF THE INVENTION

In recent years the manufacturing industry has moved towards automated procedural evaluation and testing of both the manufactured products and the processes utilized to manufacture them. This move is also driven by the goal to create a user friendly tool that would provide automated evaluation tools for the various departments involved in the manufacturing and planning process, such as research and development (R&D), validation, verification, and support departments to allow process evaluation in addition to the automated hardware and software product testing. Therefore the shift in focus has expanded the use of automated testing and evaluation tools by making them available to the other departments associated with the manufacturing industry.

Automated testing consists of creating sequences of reusable interactions with test and measurement equipment and then running them on a product to test its various features. Generally, the process of creating test sequences can be complex and often requires programming skills. Currently, test engineers use a number of interaction styles to build test sequences which rely on menus for selecting the relevant functions and testing elements and primarily on command language programming to define the test protocol or sequence.

Various applications use direct manipulation and have introduced a graphical approach to data flow for the purpose of undertaking test and measurements related to manufactured products. For example, a user may create processes or diagrams by placing different shapes representing objects of interest and connects them using connectors, as in a flow chart. The connectors are usually represented by lines that can be drawn by the user or automatically created by the system. However, such lines connected test representations are limiting as a user cannot readily manipulate, move or amend connecting lines without reworking the complete process. This limitation is particularly evident in that when attempting to manipulate the graphical process as the connectors moves with its associated shape, not allowing quick and seamless amendments of a small portion within the flow chart. Accordingly, such interaction demands that a user invest time, resources and thought into recreating the flow chart merely to change a single member of the flow chart, while managing both shapes and their respective connectors.

Furthermore, currently available graphical tools are only useful to define operations of systems by connection of inputs and outputs (connector line), however, they become cumbersome when used to sequence and coordinate between procedures; therefore all currently available sequencers are not truly graphical.

The solutions offered today include programming (graphical or textual) tools for writing the drivers and creating the interfaces for operating and creating the test steps, that leads to, complex operations that may be required immediately require developer skills to be implemented correctly. Furthermore, unraveling the interrelated links between various connections within a flow chart is a difficult and often burdensome process when attempting to understand the testing protocol using state of the art workflow charts.

In fact if the same testing development assailment will be done by 2 different engineers, even with the same set of tools, the output will be different in means of UI, data collection, result data format, test flow format and it's documentation, test efficiency and coverage, Furthermore, solutions offered to date provide a tree like flow configuration where each step is a unidirectional black box. The tree format is limited to a one path vertical display, preventing a natural flow chart display.

Use of the current tools to create the flow chart is inconvenient to the user since the main issue in creating components is defining logic, inputs and outputs. This is the main reason for connection lines between the different objects, whether if only for input and output or for triggering events. The test flow is actually a sequence where the main interest is to set the correct order of the steps and to define the different flows, logics and branches of steps.

SUMMARY OF THE INVENTION

Thus, there is an unmet need for a system and method providing test engineers with the ability to create, schedule and sequence hardware and software test sequences in a visual and graphical sequencing platform. Such a graphical tools saves test engineers much time, investment, planning, processing, creating and modifying testing protocols for a UUT.

Specifically, an optional embodiment of the present invention provides users with tools to readily, manipulate, amend, configure and define testing sequencing that is not currently possible with the state of the art flowcharts or flow tree diagrams. There exists a need for such a graphical system and method that employs modular building blocks to readily control, visualize, define individual sequence steps and flow within the hardware and/or software testing sequence. Therefore, rather than defining a test sequence flow by connecting a plurality of blocks with lines as is currently practiced and accepted in the art, the present invention provides for a system and method wherein the relative location of the modular building blocks according to the present invention preferably defines the flow order of the test sequence.

A test sequence is abstracted by a test engineer that undertakes a number of steps to create product testing. For example, a unit under test (UTT) is initially studied by a test engineer to understand the device and its functions, preferably to gain understanding into what type of testing is required. The initial understanding of the device allows the test engineer to clearly and quickly abstract an appropriate test sequence. Later, the variety of requirements, obtained from the various individuals involved in the product development life cycle, are considered by the engineer to ensure that all required aspects are tested, for example including all of hardware and software aspects of the product, product specification and quality assurance. Based on the multitude of data a test engineer abstracts the required test solution most preferably using a variety of tools. The test sequence is developed relative to the product requirements, for example including but not limited to interfaces and drivers for test and measurement equipment (T&M). Software components and graphical panels for defining and handling the different tools are defined. Later, data aggregation and analysis tools are place in order to collect the data measure the required parameters. Finally, the test sequence is finalized, compiled, tested and executed with a UUT.

The present invention overcomes the deficiencies of the background art by providing a system and method for the creation of test sequences using a novel human computer interface concept. An optional embodiment of the present invention provides a system, method and platform for direct manipulation of modular building blocks that correspond to hardware and/or software testing sequences. Preferably, the system and method of the present invention provides a user of varying skill level, from novice to expert, with the ability to easily and seamlessly abstracting and compose a test sequence for a unit under test (UUT).

The term "Unit Under Test (UUT)" refers to a hardware and/or software product that is undergoing testing. The term UUT may be used interchangeably with the term device under test or DUT, also in reference to a product that is undergoing hardware and or software testing procedures.

The term "test" within the context of the present application refers to any process, step or instance for evaluating, ensuring, checking, monitoring, observing, regulating, controlling, or alerting that is related to a process, procedure, process flow, decision, functional procedure or the like for the purpose of evaluating the processes in terms of at least one or more steps, a group steps, a set of steps or a product.

The term "test sequence" within the context of the present application refers to a sequence of commands or instructions that are used to test the hardware and software aspects of a product or a UUT or DUT.

The term "test sequence branch" may refer to a portion of a test sequence.

The term "sub-sequence" may refer to a portion of a short test sequence within a sequence branch or test sequence that is optionally an independent sequence or may be incorporated in a building block.

The terms building block, or test sequence building block, within the context of this invention refers to the elementary graphical units that may be combined to create a test sequence or test sequence branch, where each building block comprises a step within the test sequence.

The terms sequencing platform, or test developing platform, within the context of the present invention refers to the display area, canvass or stage on which building blocks are compiled to create, build and amend a test sequence.

The terms test platform or testing platform within the context of the present invention refers to the collective system and method according to an optional embodiment of the present invention preferably comprising software and hardware tools used to create and execute hardware and/or software testing sequences.

An optional embodiment of the present invention provides a system and method for computer aided design (CAD) of functional test and processes. An optional embodiment for a procedural CAD system and method preferably provides a user data centered about the functional test and process evaluation. Preferably the functional evaluation CAD according to the present invention comprises a functional testing module, test execution module, requirements module, standards module, product description, process description, standards module, encapsulation module, data module and a business intelligence module. Most preferably, the evaluation CAD according to the present invention comprises fluid communication between modules to facilitate data flow from one module to another. Optionally and preferably, the standards module further comprises standard reporting, documentation, communication, data, between at least two or more modules wherein the data exchanged is standardized according to a standard for example including but not limited to user defined standards, company standards, regional standards, local standards, international standards, BVQI, ISO or the like.

Preferably, the functional evaluation CAD system and method provides a user with a modular method for evaluating and testing products and processes. Most preferably evaluation and testing with a functional evaluation CAD system and method according to the present invention provides user and organizations with an evaluation of organizational processes and or products. Optionally, product and processes evaluation may be built, stored, reused, amended, customized, shared and compared between at least one or more users. Optionally, the CAD functional evaluation system and method according to an optional embodiment of the present invention may be optionally realized on a computer over a network connection for example including but not limited to an internet or intranet connection, host, client server or the like network configuration.

Most preferably, the evaluation CAD according to the present invention provides a user with a plurality of types of business intelligence data that may be valuable to an organization to evaluate its own efficiency and capabilities, for example.

Optionally, a preferred embodiment of the present invention provides a user with data to early, quickly and seamlessly abstract a test sequence or an evaluation sequence by integrating standardized requirements with modular encapsulated building blocks.

The method and system according to a further optional embodiment of the present invention most preferably provides a test engineering tool comprising a plurality modular building blocks comprising hardware and software test definitions and step wise instructions allowing a test engineer to abstract and undertake a test sequence according to the product requirements for a UUT by controllably defining and combining a plurality modular building blocks according to the present invention. Most preferably, the platform according to the present invention provides a cost and time saving tools that saves a test engineer much time and effort in creating the test sequence therein allowing the test engineer to invest most of his or her time into writing and defining the actual test sequences.

Preferably, the system and method according to the present invention provides a tool comprising a large library of readymade components, preferably providing support for all the functionality required in creating a test sequence. Optionally, the readymade tools provides a user with an application level user interface allowing configuration and setup in a quick and intuitive manner for the test sequence of interest. Optionally and preferably, the readymade tool may be readily and efficiently utilized by non-expert level users.

Preferably, the system and method of the present invention provides for creating fluid test sequences comprising splitting, branching, delayed and parallel processes between process and within a single process.

Most preferably a fluid test sequence is created by placing modular building blocks relative to one another within a user interface comprising a test development platform or sequencing platform. Preferably, each new modular building block is placed relative to its predecessor, above or below for successive blocks (in series), left or right for branched blocks (in parallel). Therein, the relative location of the building blocks preferably defines the flow order within the test sequence.

An optional embodiment of the present invention provides a user with a plurality of elemental building blocks with which the user may define, customize, or abstract a plurality of testing protocols in keeping with the manufacturing requirements of the UUT. The elemental modular building blocks preferably correspond to at least one process undertaken during a test sequence. Most preferably, the elemental modular building blocks may be categorized according to the type of action or procedure comprised therein, for example including but not limited to logic test sequences, software test sequences; communication protocols, test & measurements equipment, administrative protocols, utilities, third party API, reporting tools, protocols or the like groups.

Optionally logic test sequences comprise logical test sequences for example include but are not limited to parallel, parallel process, start, case block, loop block, while, wait for event, delay, terminate, set event, end, analysis, conditional criteria, paraloop. or the like in any combination thereof.

Optionally communication building blocks comprise communication test sequences for example including but are not limited to serial, TCPIP, UDP, Telnet, GPIB, USB, FTP, parallel, Web GUI, Web services, FTP, BUS, TFTP, MAIL, CLI, SNMP, SSH, HTTP, Application GUI, or the like in a any combination thereof.

Optionally software building blocks comprise software specific test sequences for example including but are not limited to exe, .net dll (dot net dll), win32 dll, activex, webservices, python, java script, vb script, perl, tcl and batch, or the like in any combination thereof.

Optionally administrative utilities blocks comprise test sequences for example including but are not limited to File Engine, MatShell, and Transformation or the like. Optionally file engine building blocks provides for at least one or more functions for example including but not limited to data file management, loading information, import and exporting information, moving files, deleting and the like functionality. Optionally MatShell building blocks provide for mathematical and statistical analysis for data analysis for example including but not limited to varying levels of mathematical and statistical functioning, basic and advanced mathematical and statistical functions. Optionally transformation building blocks provide for textual analysis for example including but not limited to parsing textual data, OCR optionally providing for further use optionally with built in parsing functions.

Optionally a plurality of groups may be formed to include the type of procedure undertaken for example including but not limited to protocols relating to tests and measurement (T&M), analytical, logical, third party software, software, communication, or the like. Optionally, a user may define new groups of testing protocols. Optionally, the grouping may be readily identifiable using clear visual or audible cues for example including but not limited to color coding, icons, audible cues or the like.

Optionally the elemental modular building blocks according to the present invention for Test and Measurement (T&M) protocols comprise blocks that represent different types of testing equipment for example including but not limited to an oscilloscope, spectrum analyzer, Geiger counter, voltmeter, decibel meter, odometer, tachometer, pressure meter, flow meter, DC power, AC power, analog I/O, attenuators, audio analyzers, camera, chamber, communication, counter, data transmission, digital I/O, digital wave, electronic load, function generator, multimeter, network analyzer, power meter, power supply, pulse pattern generator, scope, signal generator, sound, spectrum, switch, mobile, traffic generator or the like as is known and accepted in the art.

Optionally when selecting the elemental modular T&M building block a relevant T&M panel is made available to the user wherein the user can define the relevant test requirements and the relative manipulations required by the UUT. For example, a user preferably determines and defines parameters including but not limited to the relevant equipment type, equipment family, vendor, appropriate vendor driver, specific functionality required, hardware interface and the like.

Optionally the user is provided with analysis building blocks providing a user with an interface relating to the analysis required by the UUT. Optionally and preferably, analytic building blocks are associated with T&M building blocks to analyze the results obtained with the T&M building blocks. Optionally, a T&M may be configured to automatically comprise the relevant analytical procedure.

Optionally, a user is provided with logic building blocks. Optionally and preferably, the logic building blocks comprise a plurality of logical functional blocks for example including but not limited to start and end, case, parallel, loops, while, terminate, if then, conditional, set event, group, paraloop, wait for event, lock & unlock, or the like. For example, a parallel logical building block may be used to incorporate a parallel process within a test sequence. A case building block may be optionally utilized to add conditional setting with the test sequence, for example, if the power supply is greater than X perform Y, otherwise perform Z.

Optionally, logical building blocks may be used to control a testing sequence flow for example by utilizing conditional building blocks for example including but not limited to a case, parallel and set event and wait-for-event blocks, or the like conditional building blocks.

Optionally, the system and method of the present invention provides a user with parallel building blocks: These building blocks form parallel processing within a sequence.

Optionally, the system and method of the present invention provides a user with loop building blocks. Optionally, loop building block pairs comprise a start and an end loop building block that preferably define a sub-sequence that is to be executed within the loop sequence when the loop conditions occur.

Optionally, the system and method of the present invention provides a user with a "while" building block. Optionally, while building blocks comprise a while start and end building blocks that preferably define a sub-sequence that is to be executed within the while sequence when the loop conditions occur. Optionally, the system and method of the present invention provides a user with temporal and flow control within a test sequence by setting conditional events and waiting for the condition to exist. Optionally and preferably such conditional events may be implemented with at least two building blocks. Optionally a first block is utilized for setting or defining the event condition and a second block to wait for the event or condition to exist. Optionally, the first and second building blocks may be located anywhere on a test sequence, optionally, on separate test sequence branches, within the same branch, within a sub-sequence. Optionally, when located on separate sequence branches the branches are effectively linked by the condition.

Optionally, the system and method of the present invention provides a user with a terminate building block that terminates the test sequence.

Optionally, the system and method of the present invention provides a user with group building block that may comprise at least one or more preferably a plurality of building blocks incorporating a plurality of sequences for example including but not limited to defining a function, a sub sequence or the like.

Optionally, the system and method of the present invention provides a user with a software interfacing building block preferably able to execute software protocols, communications or otherwise iterating with an external or third party software module. Optionally, the system and method of the present invention provides a user with a generic application program interface (API) building block, for example including but not limited to a generic API, customizable API, predefined API specific to application types or the like. For example, a client specific software module may be accessed and incorporated into a test sequence according to the system and method of the present invention, optionally by using an generic API building block and then customized to the user's application needs. Optionally, a generic API building block may be customized according to the user's specification and be saved for future use.

An optional embodiment of the present invention provides for exporting test sequences, building block sequences to a generated code that may optionally be run on an appropriate programming language or script interface, for example including but not limited to C, C++, object oriented language, markup language, XML, TCL or the like as is known and accepted in the art. For example, a test sequence may be converted to a C++ form and exported, edited, amended, copied or other programming platform that compile and execute C++ language protocols.

Optionally, a building block may be created to undertake any functional test by optionally defining at least one or more of the testing parameters for example including but not limited to inputs, outputs, setting, configuration options, and analysis options or the like parameters.

An optional embodiment of the present invention provides a user with a graphical tool that allows a user to visually manage testing resources while supporting process automation planning. Optionally, the building blocks according to the present invention may be manipulated based on resource testing. Optionally the building blocks according to the present invention provide both a testing sequence and time scaled testing sequence optionally in the form of a resource time plot for example including but not limited to a time scaled plot, a Gantt chart or the like.

Optionally, a time and resource optimized testing sequence according to an optional embodiment of the present invention provides a user with the ability to further control the testing sequence its timing and resources availability. Optionally and preferably, such time and resource control is provided automatically to optimize at least one parameter for example including test performance, test time, or test resource usage. Optionally automated temporal and resource optimization is performed by a computer. Optionally, temporal and resource control may be controlled by the user. Optionally temporal and resource control may be controlled in a semiautomatic manner both by a user and computer.

An optional embodiment of the present invention provides a method for implementing a testing sequence using directly controllable modular building blocks comprising abstracting software and hardware test requirements; and defining a plurality of modular building blocks corresponding to the software and hardware test requirements; and building the test sequence by stacking the plurality of modular building blocks on a matrix platform forming a relative stacking order. Optionally and preferably the relative location of the plurality of modular builder blocks on the matrix platform determines the test sequence.

An optional embodiment according to the present invention may be provided for testing a plurality of products and process for example including but not limited to testing resource management, process automation as it applies to an organization, product or process. Optionally resource management comprises defining resource attributes required to execute a test sequence on a given UUT forming a common denominator attributes specific to the resource. Optionally resource testing may be performed for example including but note limited to is test equipment, hardware, software, software module and API.

Unless otherwise defined the various embodiment of the present invention may be provided to an end user in a plurality of formats, platforms, and may be outputted to at least one of a computer readable memory, a computer display device, a printout, a computer on a network or a user.

Unless otherwise defined, all technical and scientific terms used herein have the same meaning as commonly understood by one of ordinary skill in the art to which this invention belongs. The materials, methods, and examples provided herein are illustrative only and not intended to be limiting. Implementation of the method and system of the present invention involves performing or completing certain selected tasks or steps manually, automatically, or a combination thereof. Moreover, according to actual instrumentation and equipment of optional embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer, a cellular telephone, a smart phone, a PDA (personal data assistant), a pager. Any two or more of such devices in communication with each other, and/or any computer in communication with any other computer, may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention provides a system, method and platform for creation of test sequences using a novel human computer interface concept. A preferred embodiment of the present invention provides a system, method and platform for direct manipulation of modular building blocks that correspond to hardware and/or software testing sequences. Optionally, the system and method of the present invention provides a user of varying skill level, from novice to expert, with the ability to easily and seamlessly abstracting and compose a test sequence for a unit under test (UUT).

The principles and operation of the present invention may be better understood with reference to the drawings and the accompanying description.

Figure 1A:
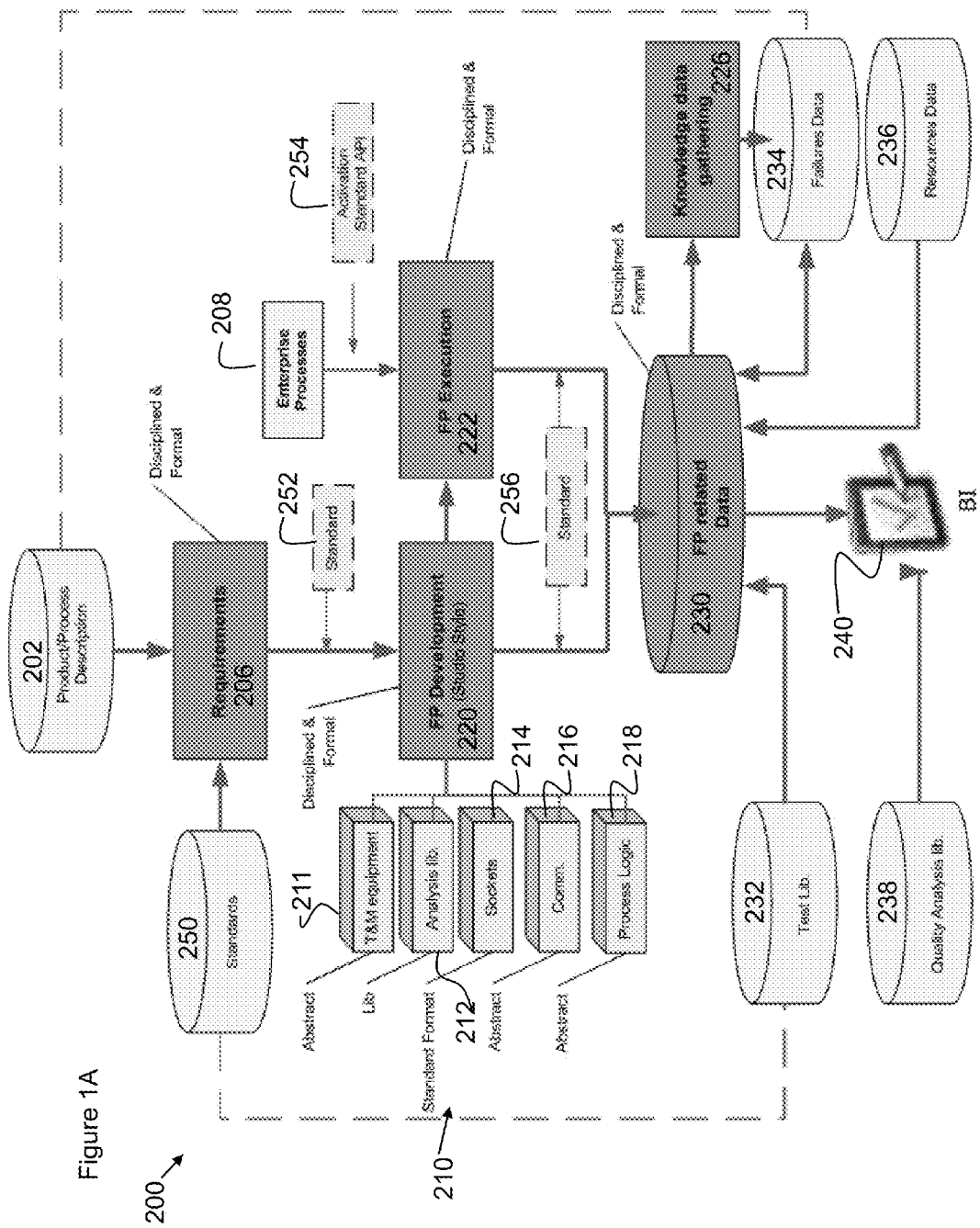
FIG. 1A-B are schematic block diagrams of exemplary system according to the present invention.

FIG. 1A shows a system 200 according to a preferred embodiment of the present invention for computer aided design (CAD) for functional evaluation of products and processes. Preferably, system 200 comprises functional testing module 220, test execution module 222, requirements module 206, standards module 250, product and process description module 202, encapsulation module 210, evaluation data module 230, business intelligence module 240. Most preferably, the evaluation CAD according to the present invention comprises fluid communication between modules to facilitate data flow from one module to another. Optionally and preferably, standards module 250 comprising at least one and more preferably a plurality of standard engines to provide a user with standardized data exchange and storage between modules. For example, standard module 250 optionally comprises standard reporting and documentation engine 256, standard communication engine 254 and standard data engine 252. Preferably, standardized communication formats for example include but are not limited to user defined standards, company standards, regional standards, local standards, international standards, BVQI, ISO or the like.

Preferably, the functional evaluation CAD system 200 provides a user with a modular mechanism for evaluating and testing products and processes. Optionally and preferably, products and process description module 202 is used with standards module 250 to abstract standardized evaluation and test requirements 206 for the evaluation of products and or processes of interest. Optionally, requirements module 206 may be defined directly by a user from a plurality of sources, for example including but not limited to research and development team, quality assurance, manufacturing, marketing, third party requirements, or the like. Most preferably, requirements module 206 comprises all requirements relating to a product or process that is to be evaluated.

Most preferably, the process for evaluating requirements 206 is defined functional testing module 220. Most preferably, functional testing module 220, according to a preferred embodiment of the present invention as described in greater detail in FIG. 1B, utilizes modular building blocks to create and build a test sequence used to evaluate the product or process defined in requirements module 206. Preferably, a test sequence is abstracted with functional testing module 220 with modular building blocks according to the present invention comprised within encapsulation module 210. Preferably, encapsulation module 210 provides a user with a plurality of building blocks library for example including but not limited to test and measurements (T&M) building blocks within T&M module 211, analytical building blocks within analysis module 212, sockets module 214, communication module 216 and processes logic module 218, for example. Optionally and preferably encapsulation module 210 provides a user with readily available modular building blocks and references that may be used to create a testing or evaluation sequence for the product or process under evaluation. Optionally, system 200 may automatically abstract an evaluation process or test sequence within functional testing module 220 based on requirements 206 with the tools and building blocks made available by encapsulation module 210.

Preferably, a test sequence abstracted with functional testing module 220 is executed within execution module 222. Optionally and preferably execution of the test sequence is preformed in accordance with a user or enterprise based protocols and processes as defined in enterprise processes 208. Optionally and preferably, module 208 provides a process management tools able to initiate execution of sequences created testing module 220. Optionally, activation and execution of test sequences created in module 220 is facilitated by module 208 provided to a plurality of management tools optionally including but not limited to internal management tools or third party management tools.

Preferably, enterprise processes are standardized with activation standards defined by standard communication engine 254. Optionally, communication standards engine 254 is used to ensure that scheduling from enterprise processes module 208 is standardized according to standards defined in standards module 250 to allow seamless execution of the test sequence and future data flow. Preferably, execution module 222 comprises report and analysis of the results of the evaluation process.

Preferably, evaluation results following test execution 222 are compared with the executed test sequence defined in functional testing module 220 and optionally stored in a standardized manner with module 256 in evaluation data module 230 for future reference. Optionally and preferably, evaluation data module 230 comprises a plurality of repositories (not shown) that are preferably used to obtain data from the test sequence and test results. Optionally, the data in evaluation data module 230 is parsed to and deposited in at least one or more repositories comprising test library repository 232, failure data repository 234, resource data repository 236 and quality analysis repository 238. Most preferably data from evaluation data module 230 is used to provide business intelligence module 240 with data that may be used to improve and generally evaluate the business and test process overall, providing a user with significant insight into the testing and evaluation of products and processes within an organization. Most preferably, data comprised within at least one or more repositories 230-238 is made available and may be queried by intelligence module 240, optionally and preferably the extracted data may then be used to report, analyze and further reflect data or to obtain additional useful information.

Optionally, data may be further analyzed and obtained from analysis module 226. Module 226 preferably and optionally provides a user with the option of inserting additional descriptions and statistics relating to results and tests optionally providing a plurality of decision making supportive tools. For example, after debugging a test or process procedure, identifying the problem, module 226 allows the user to incorporate the problem and solution to system 200 therefore allowing future recommendation when similar instances occur. Optionally, module 226 comprises suggestions of one or more actions to perform in relation to the occurrence, for example, how to prioritize procedures or sequences, determine frequency of occurrence, determine related costs, length of test and the like, steps required to resolve occurrence or the like ramifications of a particular occurrence.

Optionally data in test library repository 232 is saved in accordance with standards module 250, providing a user with future reference to historical test sequences. Most preferably, access to the test repository 232 provides a user with ability to abstract new tests sequences with test sequence module 220 utilizing encapsulation module 210 to quickly create test sequences relative to requirements 206 optionally using a plurality of methods for example including but not limited to trial and error, reuse, tracking, version control or the like. Optionally, this would allow a user to abstract a test sequence optionally early in the evaluation and requirements process based on existing test sequences.

Figure 1B:
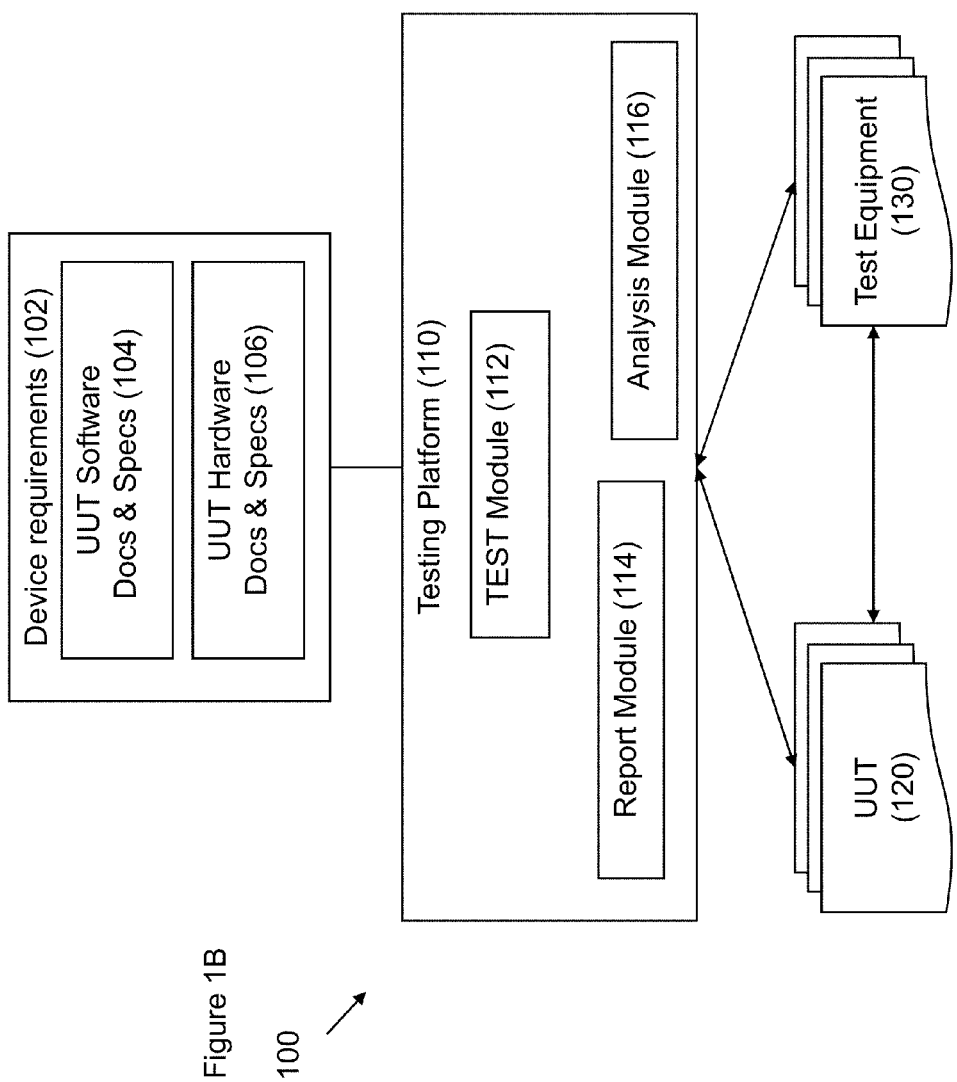

FIG. 1B shows a system 100 according to a preferred embodiment of the present invention. System 100 comprises device requirements 102, test platform 110, unit under test 120 and testing equipment 130 Preferably, device requirements 102 comprises all testing requirements that may be incorporated into the testing sequence for example including hardware performance, software performance, hardware function, software function, hardware specification, user specification or the like parameters comprising the testing requirements for the UUT. Optionally, device requirements comprise a plurality of requirements for example including but not limited to hardware requirements 106 and software requirements 104. Optionally and preferably further requirements for example including but not limited to user interactions, user hardware interactions, user software interactions, user device interactions are optionally further incorporated. Preferably the device requirements 102 are linked to the testing platform 110 of the present invention. Optionally, device requirements are made readily available to a user, for example using a link, a hyperlink, attachments, shortcuts or the like tools for providing quick access to the requirement material. Optionally, device requirements may be available in a plurality of media for example including but not limited to reference material, documents, reports, images, video, third party material, external, standards or the like.

Optionally, testing platform 110 provides a user with the ability to readily, create, edit, manipulate, customize or otherwise control a testing sequence in keeping with the device requirements 102. Testing platform 110 preferably comprises a test module 112, report module 114 and analysis module 116. Optionally, test module 112 provides the user with a sequencing platform according to the present invention to create hardware and/or software testing sequences for a device in keeping with a plurality of device requirements 102. Preferably, test module 112 provides a user with a sequencing platform to manipulate and utilize the elementary modular building blocks according to the present invention to build an appropriate test sequence. Preferably, test module 112 provides a user with tools to relate data of the abstracted test sequence. For example a user is provided with data relating to the testing sequence for example including but not limited to parameters, variables, UUT performance, error report, test equipment performance or the like.

Preferably, test module 112 is provided with a plurality of tools to control the performance, timing of an abstracted test sequence as well as to control the building blocks themselves. Optionally, a user is provided tools for running a testing sequence, for example including but not limited to run the test sequence, perform a pre-run, stop, step by step, variable watch, or the like as is known and accepted in the art. Optionally, a user is provided with tools to control the modular building blocks according to the present invention. Preferably, modular building block tools are used to define and configure a building block as well as to control its activity during, before and after the test sequence is abstracted. Optionally, modular building block tools for example includes but is not limited to configure, family type, variables. Optionally, modular building block tool options within the testing platform are provided for example including but not limited to auto open, stickiness, resource release, clear, zoom, view enhancer or the like as is known and accepted in the art.

Optionally, report module 114 provides a user with reports relating to the test sequence and test results that is being run. Optionally, a report from the report module 114 provides a user with information relating to the performance of the UUT during the test procedure.

Optionally, report module 114 communicates with analysis module 116 to analyze the test results obtained from at least one or more UUT 120 and at least one or more testing equipment 130. Optionally, report module 114 provides a user with a report that optionally correlates the test results to the expected resulted based on the device requirements 102.

Optionally, test platform 110 interacts with a plurality of UUT 120 and at least one or more testing equipment 130 to undertaken the testing process, according to the test sequence abstracted with the test module 112 wherein its results are reported using report module 114 and analyzed with analysis module 116.

Test equipment 130 optionally comprises at least one or more different pieces of test equipment required to test the performance of a unit under test 120. Test equipment 130 for example includes but is not limited to an oscilloscope, voltmeter, odometer, Telnet, traffic generators or the like testing equipment, or any type of testing equipment system.

Optionally, system 100 comprises communication with its component. Optionally and preferably, test platform 110 comprises communication between UUT 120 and a plurality of test equipment 130. Optionally, communication is mediated using a communication configuration over a network connection, optionally including but not limited to an internet, intranet, client server, host, any type of computer network or the like communication configuration as is known and accepted in the art. Optionally, communication between UUT 120 and test platform 110 may be a direct physical connection not realized over a network connection. Optionally, a direct physical connection is mediated by optional communication ports for example including but not limited to USB, GPIB, PCI, PXI, parallel, serial, TCPIP, UDP, Telnet, Web GUI, Web services, FTP, BUS, TFTP, MAIL, CLI, SNMP, SSH, HTTP, Application GUI or the like as is known and accepted in the art.

Optionally, communication between test platform 110 and test equipment 130 is mediated by a plurality of optional communication ports for example including but not limited to USB, GPIB, PCI, PXI, Serial, parallel, TCPIP, UDP, Telnet, Web GUI, Web services, BUS, TFTP, CLI, SNMP, SSH, HTTP, Application GUI or the like as is known and accepted in the art.

Figure 2:
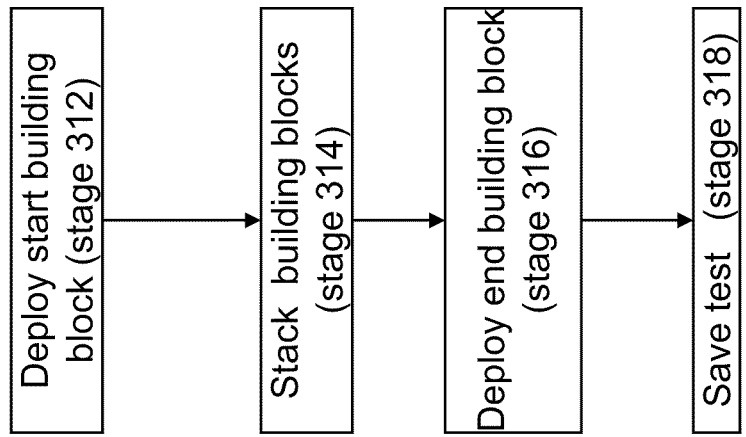
FIG. 2 is an exemplary method according to the present invention for defining a building block.

Optionally, test platform 110 according to a preferred embodiment of the present invention, may be realized on a computer or on network computer, or the like in any configuration known and accepted in the art. Optionally, test platform 110 may be linked to one or more other computers using a network connection for example including but not limited to the internet or intranet. Optionally, test platform 110 may be realized over a network connection and linked to a proprietary social network as is known and accepted in the art. Optionally, a proprietary social network may provide a user with the option of sharing, obtaining, or otherwise interacting to exchange test sequences, ideas, upload, download, create new test sequences according to the present invention FIG. 2 depicts an optional method for abstracting a modular building block according to the present invention. In stage 302 a building block category or type is chosen. Optionally, the building block category is chosen from a group of optional categories for example including but not limited to T&M, logical or analytical, third party API, software, scripts or the like. In stage 304 the test type category specific interface is accessed. Most preferably in stage 306 a user utilizes the interface to create the testing procedure required according to the feature being tested. Optionally, once all configuration settings have been defined for the block behavior according to the test requirements, testing requirements are defined in stage 306 preferably comprising defining the tool type, family, engine, properties, attributes as will be further depicted in FIGS. 6 and 7. The building block is preferably saved to a building block library, in stage 308 and is made available for future use. Optionally, the building blocks are made available to a plurality of users over a network connection.

For example, if a T&M block is being created to measure a UUT's power source voltage during a particular activity. A T&M building block is created by choosing T&M block, stage 302, preferably accessing the T&M interface in stage 304 and defining the voltage requirements, stage 306, as depicted by the device manufacturing specification. Preferably during stage 304 a voltmeter user interface (GUI) is presented to a user allowing the user to set and define the testing parameters, stage 306.

Optionally and preferably, frequently used and common testing parameters may be provided to a user in a predefined building block. Optionally, a user may customize previously abstracted building blocks to current device requirements. Optionally, once abstracted a test sequence may be shared among a plurality of users over a network connection. Optionally a user may link to different inputs and settings to sequence variables and/or parameters allowing dynamic changes to the variables and parameters according to sequence logic and state.

Figure 3:
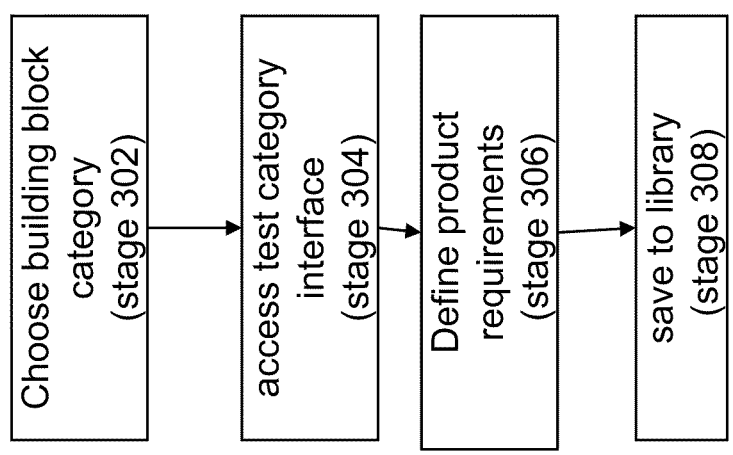
FIG. 3 is an exemplary method according to the present invention for creating a test sequence using building block defined of FIG. 2.

FIG. 3 depicts an optional method according to the present invention for abstracting a test sequence while utilizing predefined building blocks according to an optional method of the present invention as depicted in FIG. 2. In stage 312 the beginning of a test sequence is defined by placing predefined logical start building block, indicating the starting point of the test sequence. In stage 314, the test sequence is built by stacking a plurality of modular building blocks within the platform according to a preferred embodiment of the present invention. Optionally, the test sequences comprises a plurality of building blocks comprising a variety of group building blocks that are stacked in a particular order to create the test sequence according to the manufacturing requirements of the present invention.

Optionally, once the test sequence has fully been abstracted in stage 314, an end building block is deployed on the platform according to the present invention in stage 316. In stage 318 the test sequence is preferably saved.

Figure 4A:
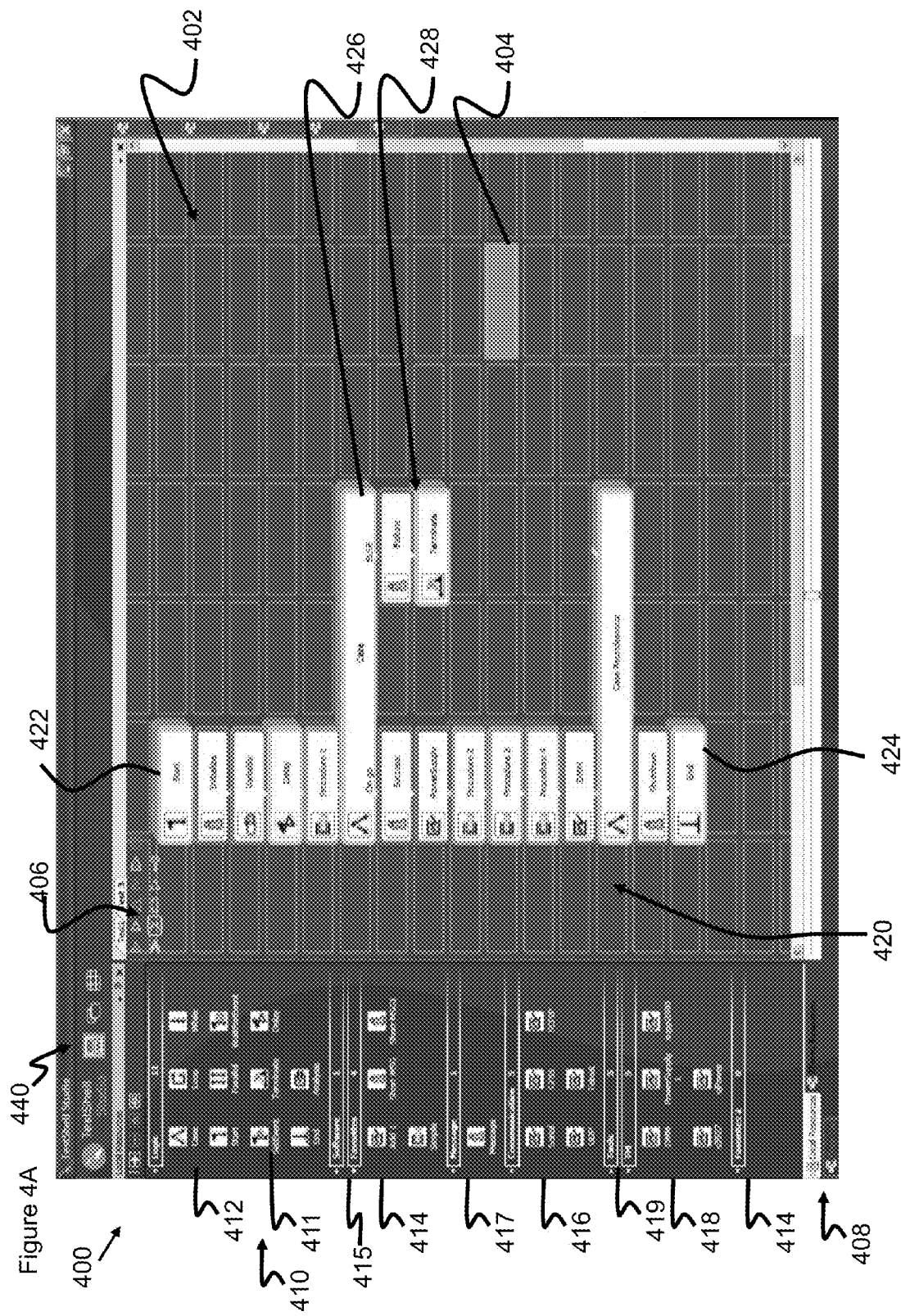
FIGS. 4A-B are exemplary diagrams of the user interface according to the present invention.
Figure 4B:
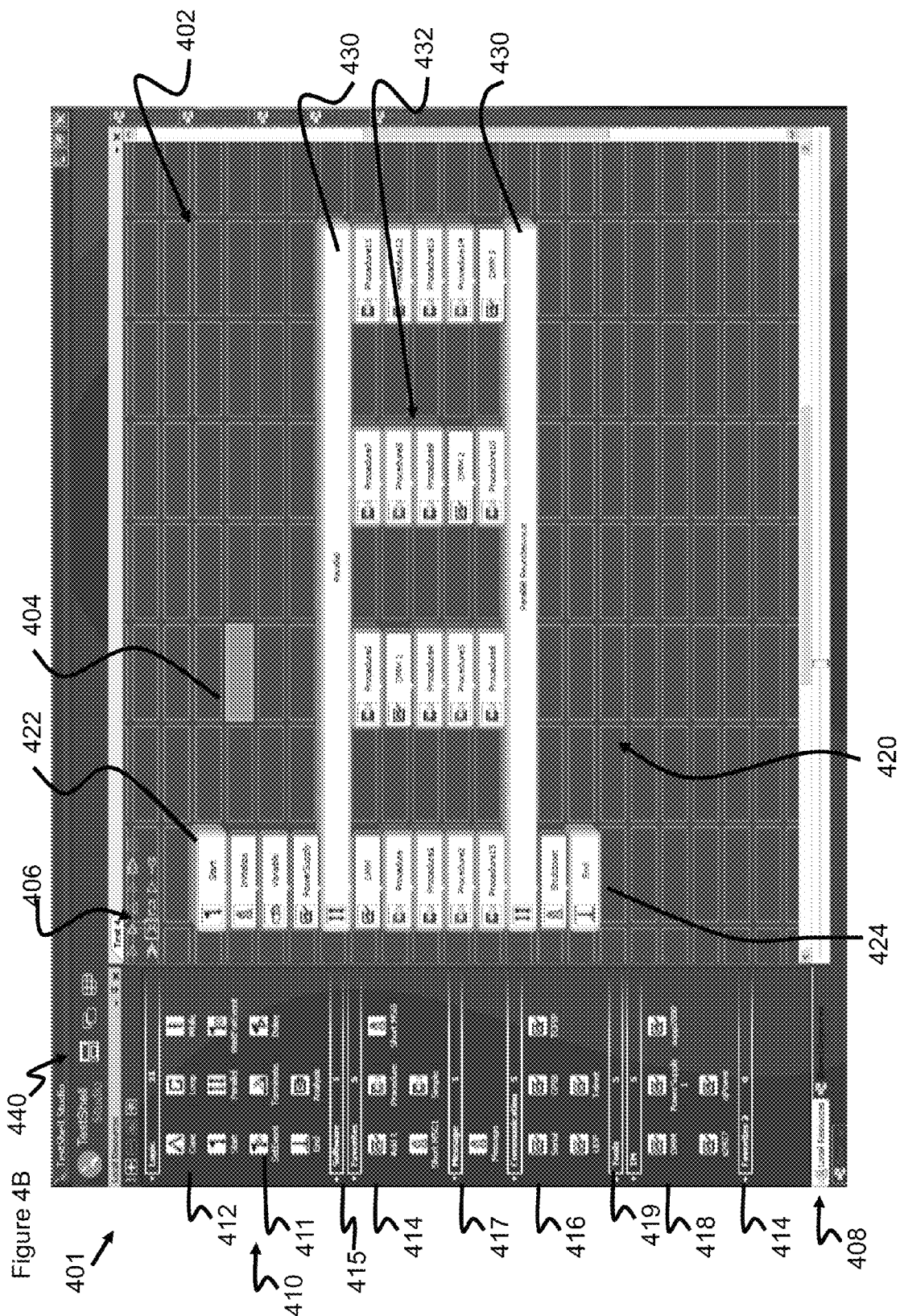

FIGS. 4A-B show an optional graphical user interface (GUI) of system and method of the present invention for a test and measurements engineering platform utilizing modular building blocks to abstract the test sequences. FIG. 4A depict the user interface 400 comprising a test sequencing platform 402, building block resource menu 410, test control panel 406, resource control panel 408, testing protocol 420 and test execution monitor menu 440.

Optionally user interface 400 provides a user with the ability to create at least one or more test sequence 420 according to the method and system of the present invention as describe in greater details in FIG. 3B. Test sequence 420 is preferably created on sequencing platform 402. Sequencing platform 402 optionally and preferably comprises a matrix like structure most preferably formed from a plurality of individual cells 404. Optionally and preferably, sequencing platform 402 comprises a matrix of 100 by 100 of cells 404. Optionally, the matrix size of sequencing platform 402 is controllable according to user defined parameters. Most preferably, cells 404 provide the location wherein elemental modular building blocks according to the present invention may be placed. Preferably, sequencing platform 402 is able to accommodate at least one and more, and preferably a plurality of, test sequences 420. Optionally, the view of sequencing platform 402 is controllable; preferably providing a user controlled view, for example including but not limited to scrolling up and down, a close up or zoom in view a particular section of the sequencing platform 402 or a global or zoom out view of sequencing platform 402. Optionally, sequencing platform 402 may provide a user with a simultaneous view of a plurality of test sequences, for example including a picture in picture view. Optionally, a small view is provided for the overall depiction of the full test sequence while a greater view is provided for a particular test sequence within the overall test sequence. Optionally, the view may be toggled between the large and small views. Optionally, the view of sequencing platform 402 is user controlled with respect to the zoom, wherein preferably the higher the zoom the more information is made visible to a user.

Test sequence 420 is preferably created using the system and method of the present invention, as described earlier in FIGS. 2 and 3. As depicted in stage 312 most preferably a test sequence 420 is initiated with a start building block 422 and end with a terminating building block 424 as described in stage 316 of FIG. 3B. Optionally, between start block 422 and end block 424 a plurality of modular building blocks may be placed on sequencing platform 402 allowing the abstraction of a complete test sequence 420 preferably comprising a plurality of building blocks designed to test a UUT (not shown) by interact with a UUT as shown and described in FIG. 1.

Most preferably, test sequence 420 is created by placing modular building blocks relative to one another within sequencing platform 402 preferably providing a top down information flow. Preferably, each new modular building block is placed relative to its predecessor, above or below for successive blocks (in series), left or right for branched blocks (in parallel). Therein, the relative location of the building blocks preferably defines the flow order of information between the two blocks. Preferably, the flow order between two building blocks is defined by an exit point of the superior block (not shown, please see FIGS. 5A-B), preferably providing a directional flow between modular blocks. Optionally and preferably, flow control within a test sequence 420 may be provided by utilizing at least one or more flow controlling building blocks chosen from resource menu 410. Preferably, test flow control may be provided with at least one or more building blocks, for example including but not limited to parallel, case, event and wait for event case or the like building blocks. Optionally and preferably, flow control building blocks are logical building blocks.

Most preferably, test sequence 420 comprises a plurality of various modular building blocks, preferably chosen from block resource menu 410 and placed onto sequencing platform 402. Most preferably a first building block, for example modular building block 411, is chosen from menu 410 and is dragged and dropped onto sequencing platform 402, therein placing a first modular brick on a corresponding platform cell 404. A second modular building block 411 is then preferably chosen from menu 410 and dragged and dropped onto sequencing platform 402 preferably above or below the first building block therein creating a link between the first and second building blocks (described in more detail in FIG. 5A). Optionally, a building block's properties are fully controlled within sequencing platform 402; for example (and without limitation) a block may be defined, created, moved, deleted, resized, enabled, disabled, copied, cut, pasted, grouped, be defined according to the number of inputs or outputs, or the like controllable features, or a combination thereof. Optionally control of building blocks within sequencing platform 402 is controlled utilizing quick keys, shortcuts, hot keys, mouse buttons, easily accessible one click menus, for example by right clicking on a mouse to access a properties menu, or the like as is known and accepted in the art.

Test control panel 406 preferably comprises a plurality of control tools for controlling sequencing platform 402 and test sequence 420 by optionally providing a tool bar comprising view controls, debug controls, and operation behavior or the like. Test control panel 406 for example comprises view controls, debug controls, and operation behavior. For example, the tools available on test control panel 406 optionally include but are not limited to play, step by step, start from here, stop, stickiness, auto open, enhanced data, hardware release, and status clear or the like.

Preferably test execution monitoring menu 440 provides a user with the ability to manage, monitoring, and tracking the execution status and results of the test sequence being executed. Optionally monitoring menu 440 comprises sub menus that may be controllably placed in and about user interface 400. Optionally monitoring menu 440 comprises sub menus for example including but not limited to process explorer, variable explorer, resource explorer, tool library, error window, variable watchers window, UUT explorer, test explorer, process explorer, regression explorer test and measurements explorer or the like.

FIG. 4B provides an additional depiction of the system and method of FIG. 4A according to a preferred embodiment of the present invention and utilizes the same labeling as in FIG. 4A for the same or similarly functioning part. Specifically, FIG. 4B depicts test sequence 420 comprising parallel programming building block 430 providing a plurality of parallel test sequences 432. Optionally, each individual parallel sequence 432 may be lead to further branching testing sequences created within sequencing platform 402, for example by using conditional testing sequences as depicted in FIG. 4A.

For example, as will be described in further details in FIG. 4D, conditional test block 426 may optionally be resized to provide an additional branches or output to undertake a conditional test sequence 428.

Optionally, block resource menu 410 provides a user with quick access to a plurality of modular building blocks that are organized by block type grouping preferably within sub-menus. Optionally and preferably, 410 comprises a plurality of submenus for example including but not limited to logical menu 412, software menu 415, test and measurements menu 418, at least one or more favorite menu 414, a tools menu 419, messaging menu 417, a communication menu 416, or the like. Optionally and preferably each submenu is visually identifiable preferably using a color coding scheme, an icon or the like visual or audible cue. Optionally, a user may define a personalized menu similar to the favorites menu 414 to include at least one or more preferably a plurality of individual modular building blocks. Most preferably, each submenu comprises at least one or more elemental modular building block 411 preferably corresponding to the type of test sequence performed. For example, a communications testing building block is preferably found under communication submenu 416. Optionally, a modular building block may optionally be found in at least one or more location. For example, a messaging test block may be found both under at least one or more favorites submenu 414 as well as its original messaging menu 416.

Preferably, individual submenus comprise at least one or more modular building blocks 411 that are preferably readily recognizable based on the test or type of action it carries out, for example by including an icon, color code or the like for easy identification. Preferably, building block's 411 properties are fully accessible and controllable within menu 410 or its respective submenu. For example, a building block 411 may be copied, defined, created, moved, deleted, resized, define characteristic the number of inputs or outputs or the like controllable features optionally utilizing a mouse click, touch screen click, or shortcut keys, or the like. Optionally control of building blocks 411 within platform 410 is controlled utilizing quick keys, shortcuts, hot keys, mouse buttons, touch screen clicks, easily accessible one click menus, for example by right clicking on a mouse to access a properties menu, or the like as is known and accepted in the art. Optionally, a modular building block 411 chosen from menu 410 comprises initial definitions relating to building block 411. Optionally and preferably a modular building block 411 chosen from menu 410 comprises a complete building block, further comprising all of its definitions and functional requirements for testing sequence 420.

Optionally and preferably, building block 411 is defined after being placed within a sequencing platform 402, activating a block configuration menu (not shown, see FIG. 6) providing a user with the optional control to define and configure the building block. Optionally and preferably, once building block 411 properties are configured and defined within sequencing platform 402; block 411 may be saved by dragging and dropping it to the appropriate menu 410 or its submenus 412 to 419.

Optionally and preferably, menu 410, and its submenus (412 to 419) comprises user defined properties that are preferably fully accessible and controllable. For example, the view of submenu 412 may be maximized and/or minimized, to show all or some of the building blocks associated therein. Optionally, menu items may be copied, defined, created, moved, deleted, resized or the like controllable features optionally utilizing quick keys, shortcuts, hot keys, mouse buttons, easily accessible one click menus, for example right click on a mouse to access properties menu, or the like as is known and accepted in the art.

Optionally, a plurality of menus 410 are preferably made available to a user through resource control panel 408. Resource control panel optionally, provide a user with access to other menus for example provided over a network connection. Optionally, control panel 408 provides a user access to further network based resources for example including but not limited to test sequences, menus, or building blocks that may be made available on a remote computer accessed over a network connection.

Figure 5A:
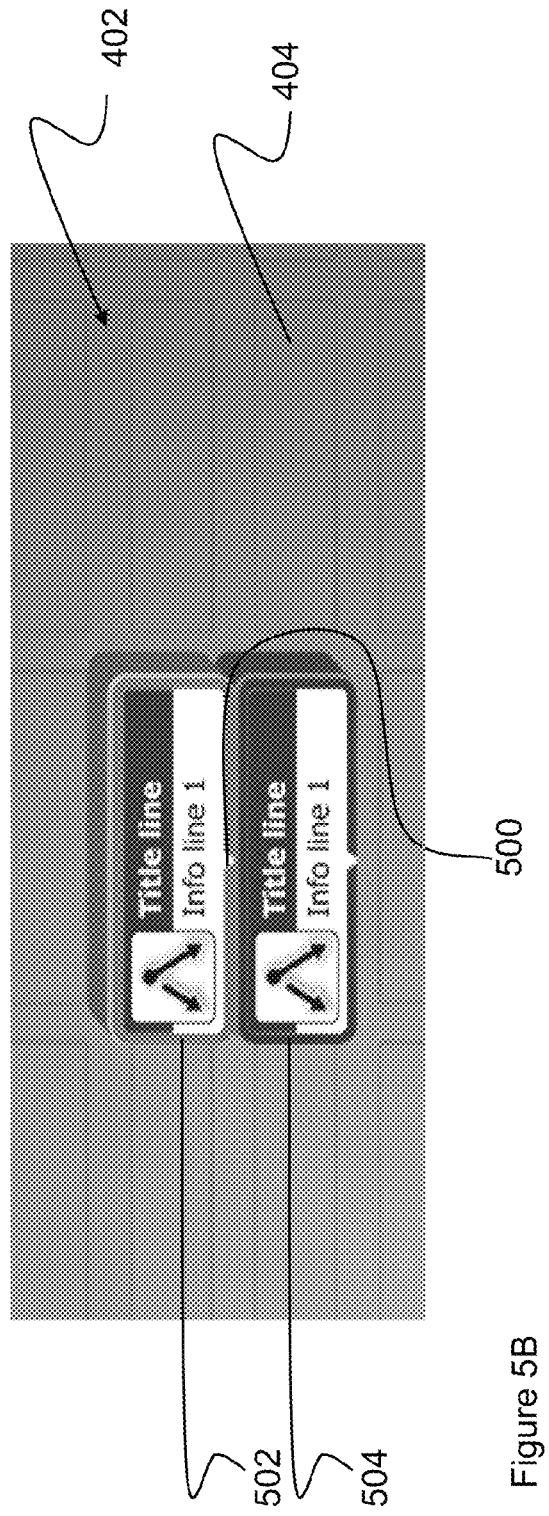
FIGS. 5A-B are exemplary diagrams of the modular building blocks according to the present invention.

FIG. 5A provides a close up view of optional modular elemental building blocks utilized in the test sequence 420 of FIGS. 4A-B. Elemental building block 502 may be sequenced to block 504 by stacking them placing them one on top of the other while preferably aligning an exit point 500 that most preferably sequence block 502 to 504 providing a seamless data link between the test sequences comprised within block 502 and 504. Most preferably, blocks 502 and 504 are aligned automatically when placed within sequencing platform 402 within cells 404.

Figure 5B:
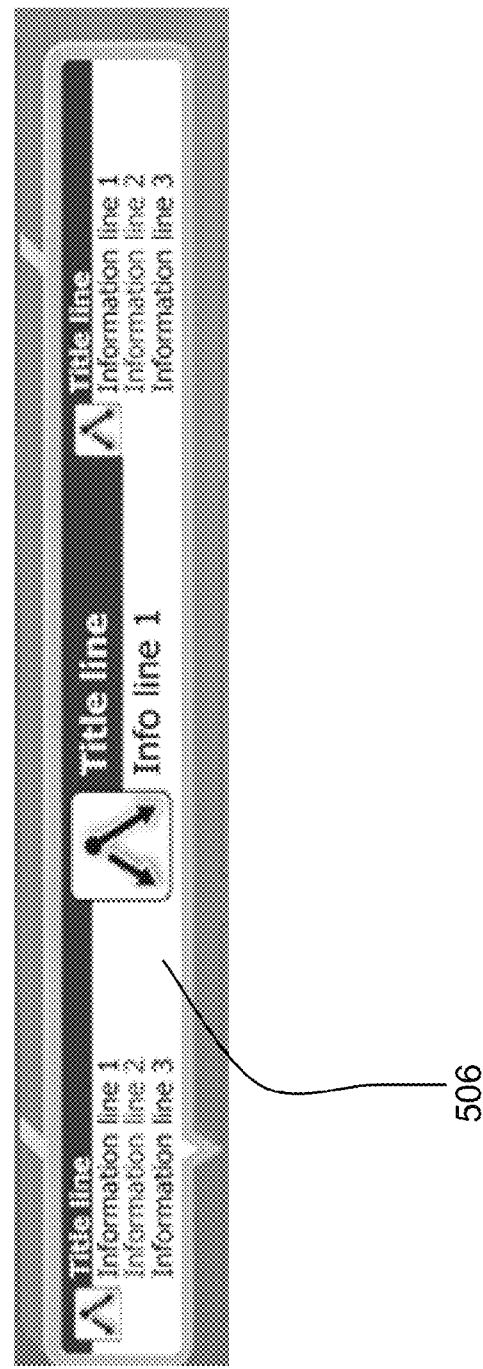

FIG. 5B provides an additional close up view of an optional conditional modular elemental building block 506. Optionally, a building block such as 502 or 504 of FIG. 5A may be stretched to allow for the addition of further conditional test sequence branches such as test sequence 428 of FIG. 4A. Conditional building block 506 may optionally be stretched to span a plurality of platform cells 404 provide for a plurality of conditional points wherein additional test sequences may be added, such as that depicted in FIG. 4A through block 426 and test sequence 428.

FIGS. 6 and 7 are further depictions of FIG. 2 wherein a modular building block according to the present invention is preferably defined and configured.

Figure 6A:
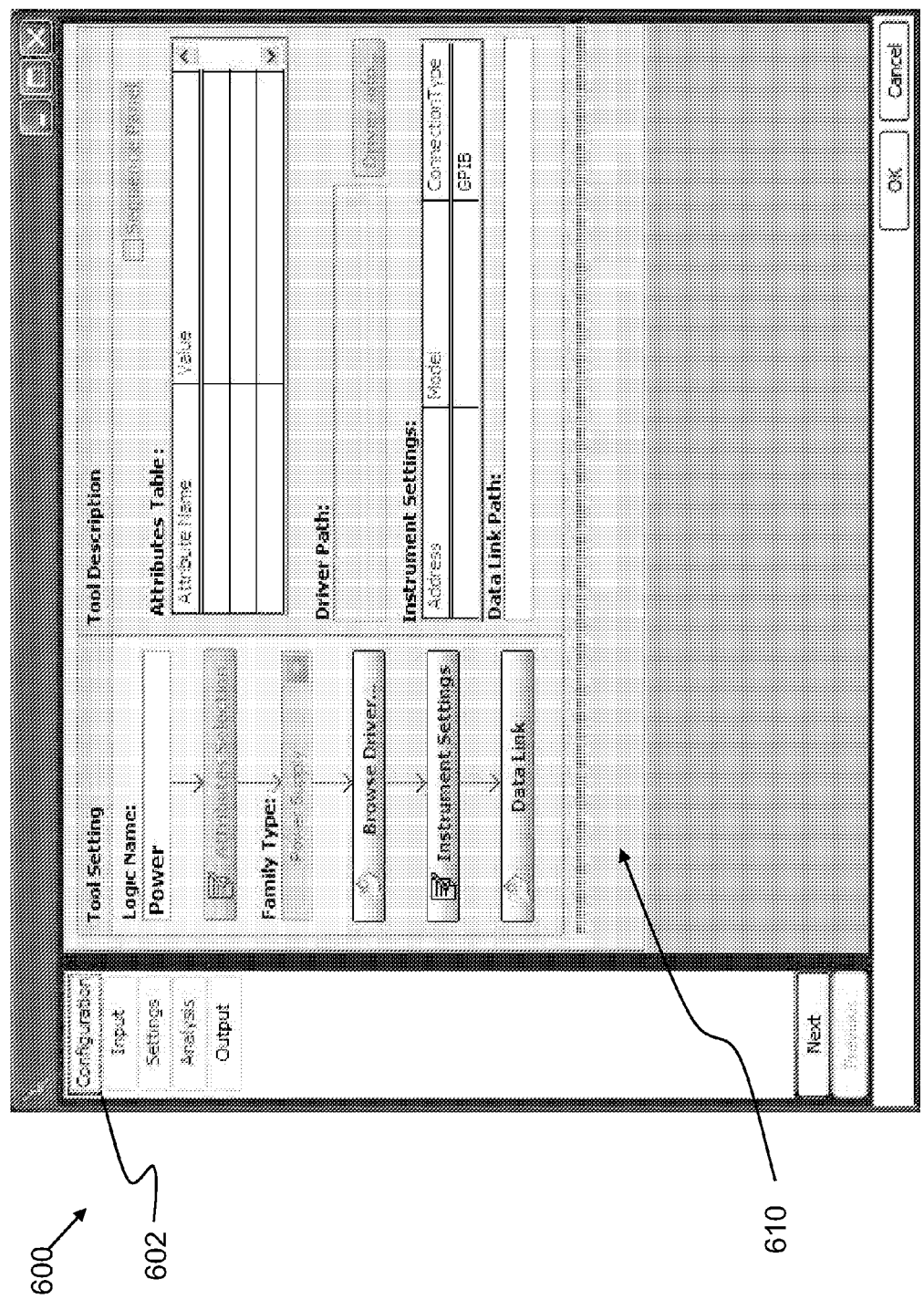
FIGS. 6A-C are exemplary diagrams of user interface to configure and define the functions of a modular building blocks according to the present invention.
Figure 6B:
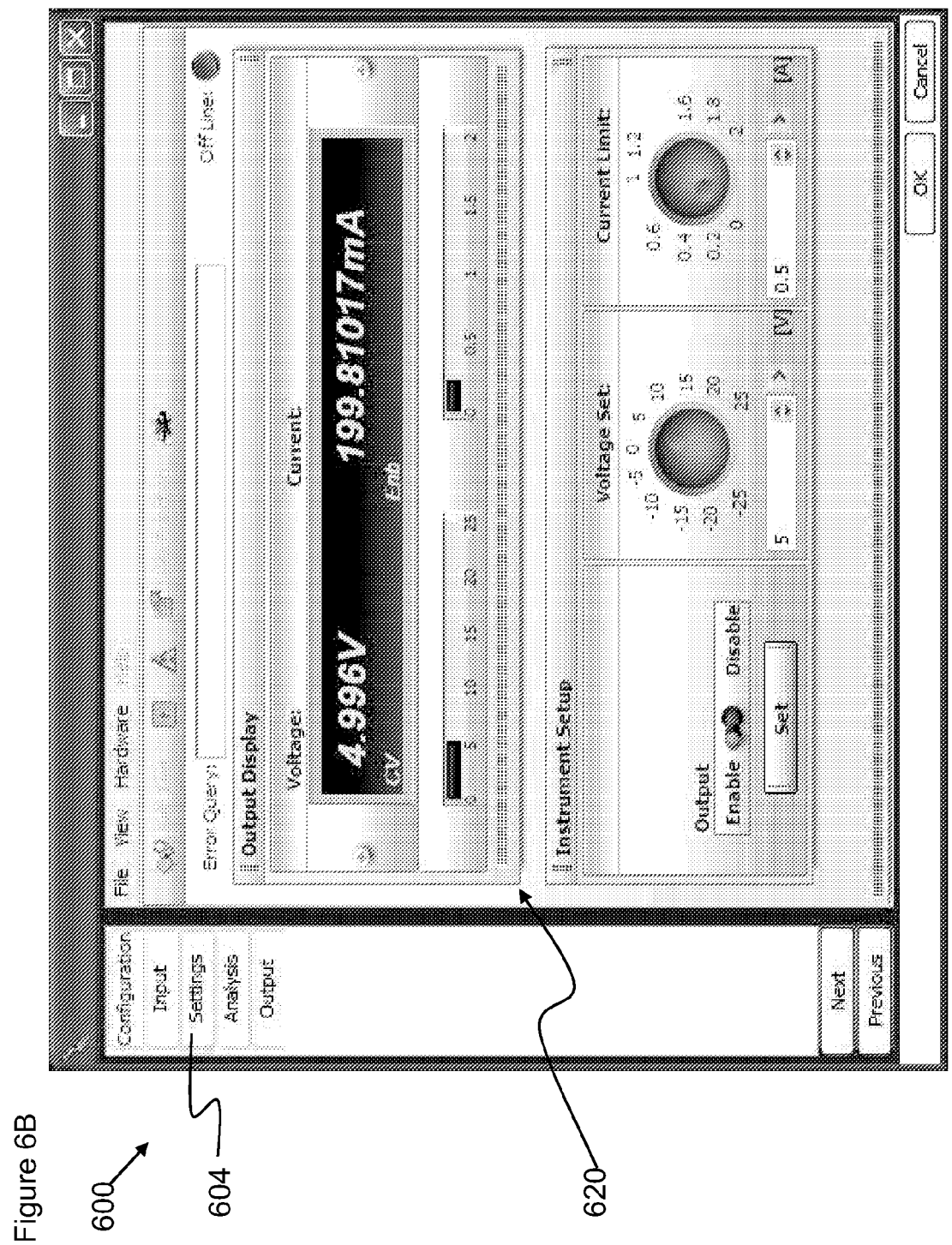
Figure 6C:
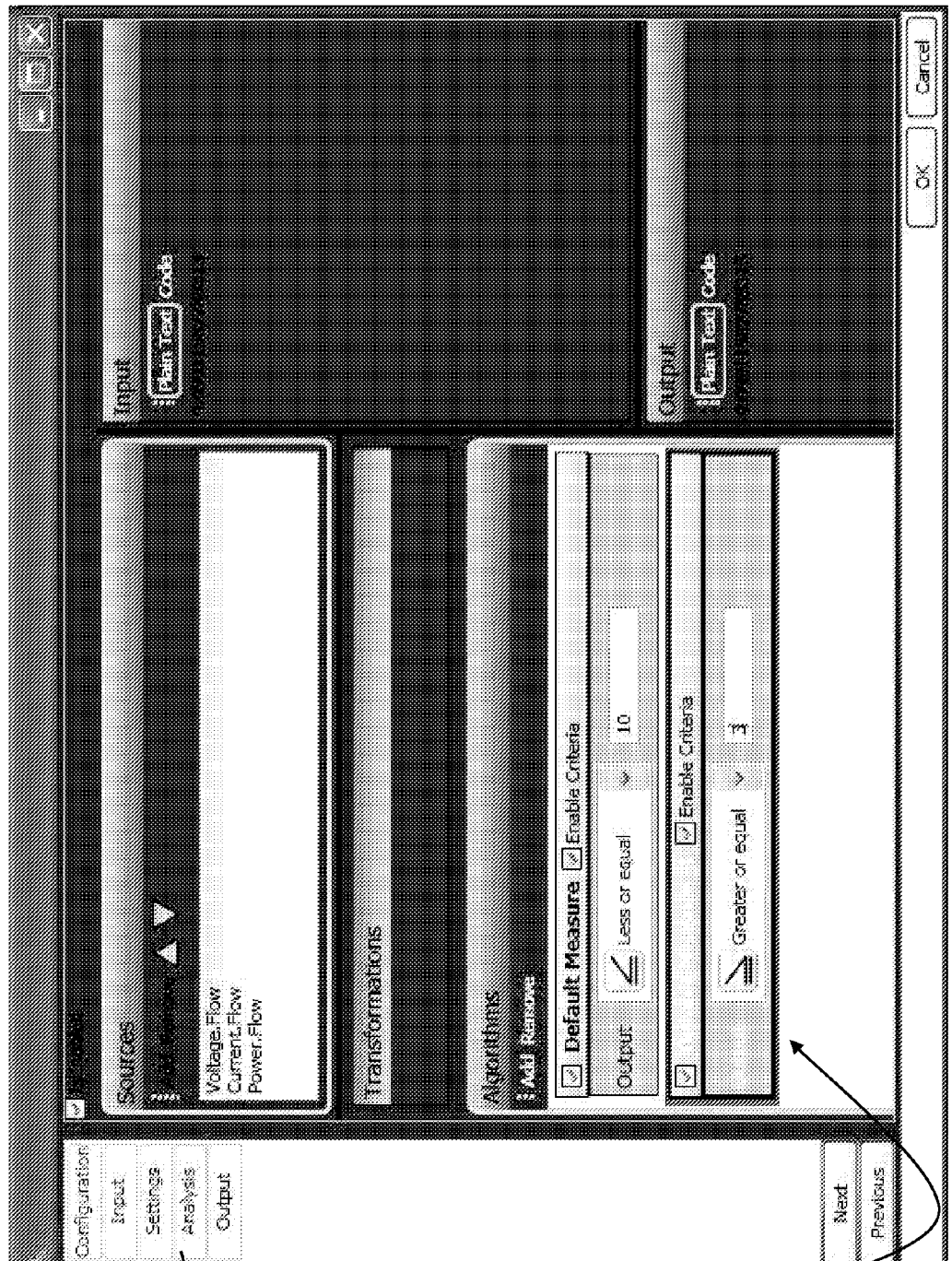

FIG. 6A-C shows screen shots of successive screens of a user interface 600 providing a user with a tool to configure a modular building block according to the present invention. Optionally, a building block may be defined and configured while on the sequencing platform 402 of FIGS. 4A and 4B. Optionally a user may control if user interface 600 is activated automatically at the time a building block is placed within the matrix sequencing platform 402. Optionally, user interface may be activated and accessed manually by using a selection of iconic tools for example including but not limited to a double click, touch screen activation, mouse click, link, shortcut or the like tools of selection and user interface activation. FIG. 6A depicts an optional user interface wherein the testing requirements for a Power supply are configured using configuration menu 602. Optionally and preferably, user interface 610 is used to configure the building blocks activity. For example interface 610 provide a configuration interface comprising defining the type of test equipment to be used, define attributes for the relevant test equipment, depict a driver for the chosen test equipment, defined the equipment settings. Optionally, equipment requirements or the like reference material may be associated and linked to the building block.

FIG. 6B depicts a further stage in using user interface 600 for configuring the power supply of FIG. 6A. Optionally and preferably interface 620 is provided to a user allowing a graphical platform to define the instrumentation settings required for a given test sequence.

FIG. 6C depicts a further stage in configuring and defining the modular building block according to the present invention. User interface 630 provides a user with a graphical tool able to defined and configure the testing equipment preferably comprising an analysis menu 606. Preferably, analysis menu 606 provides a user with the ability to select data channels received from the equipment and/or software modules while defining further analysis to be performed on the data. Preferably, analysis menu 606, provides a user with the ability to control and manipulate the data in order to obtain the data required for the test procedure, preferably by defining transformation, functions or other manipulations specific to the block being defined. Optionally, data analysis may give rise to new data that may be utilized or otherwise manipulated in other building blocks or testing sequences, events or procedures. Preferably and optionally, data analysis performed within menu 606 provides for defining at least one or more manipulations and/or transformations of data, leading to pass fail criteria. Optionally and preferably pass fail criteria are in accordance with product (UUT) specifications and or requirements. Optionally, a block may be utilized to define a function or algorithms in keeping with the hardware and software requirements of the test sequence. For example, parameters defining the hardware and/or software requirements are controlled optionally defining, input and outputs, algorithms, sources, and transformations, or the like.

Figure 7A:
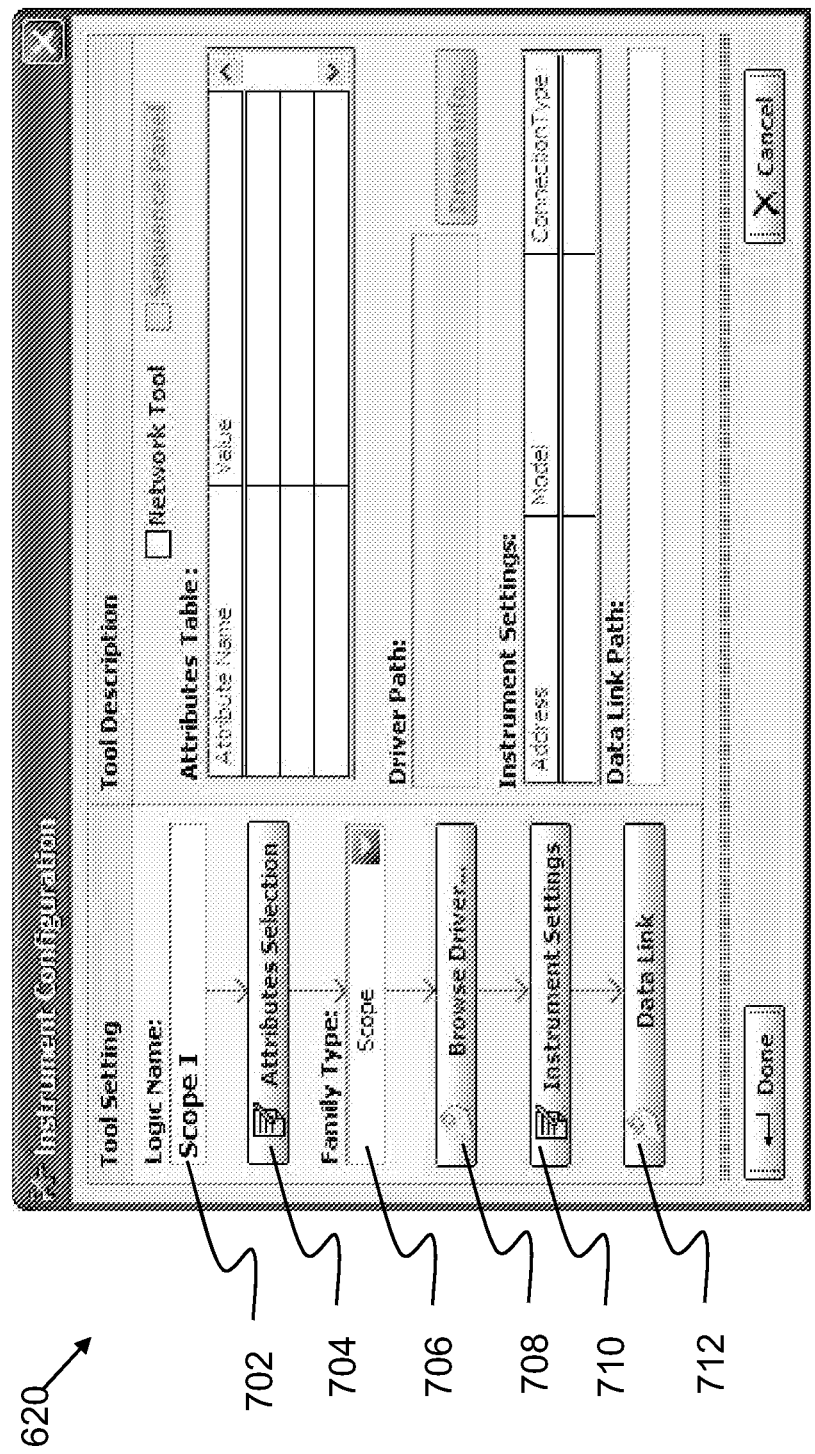
FIGS. 7A-C are exemplary diagrams of a user interface to configure and define the functions of a modular building blocks according to the present invention.
Figure 7B:
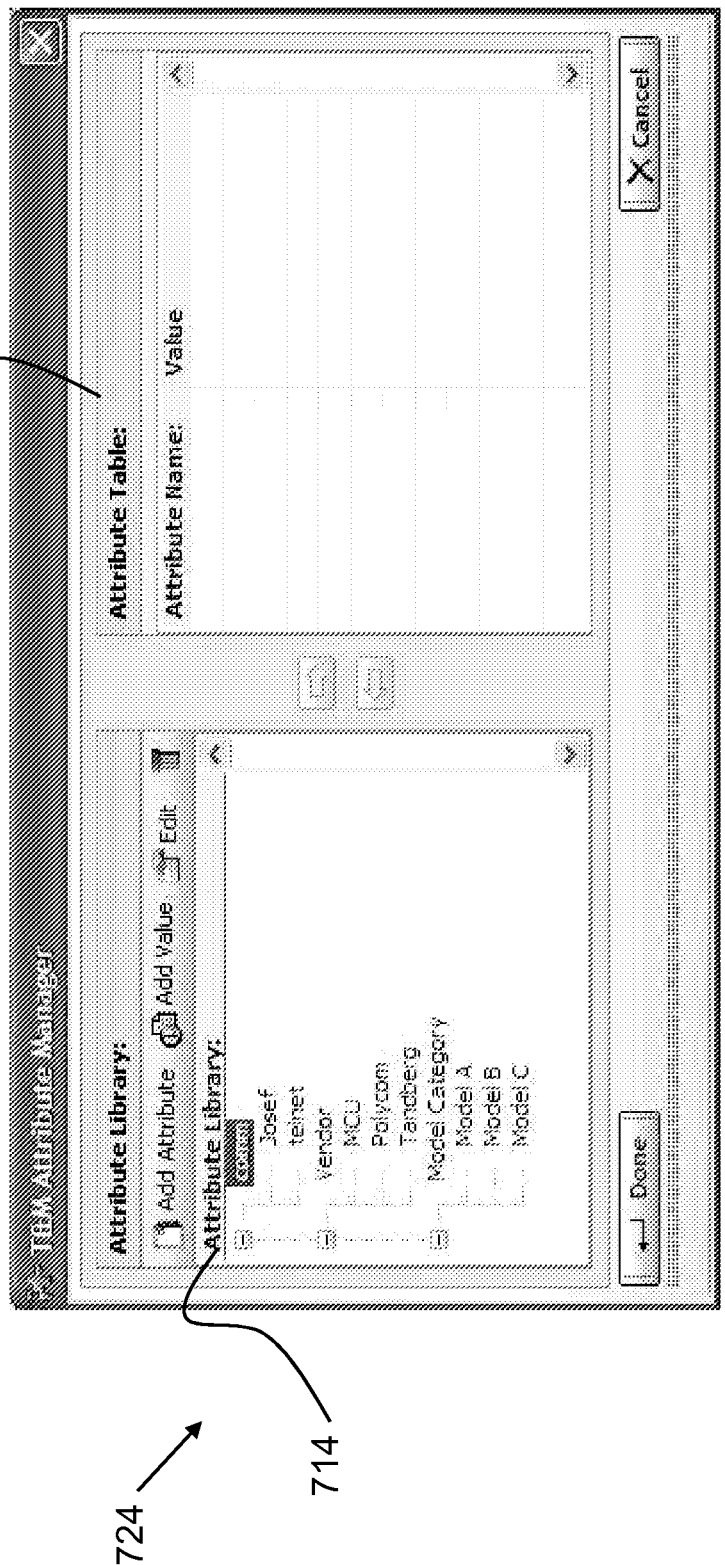
Figure 7C:
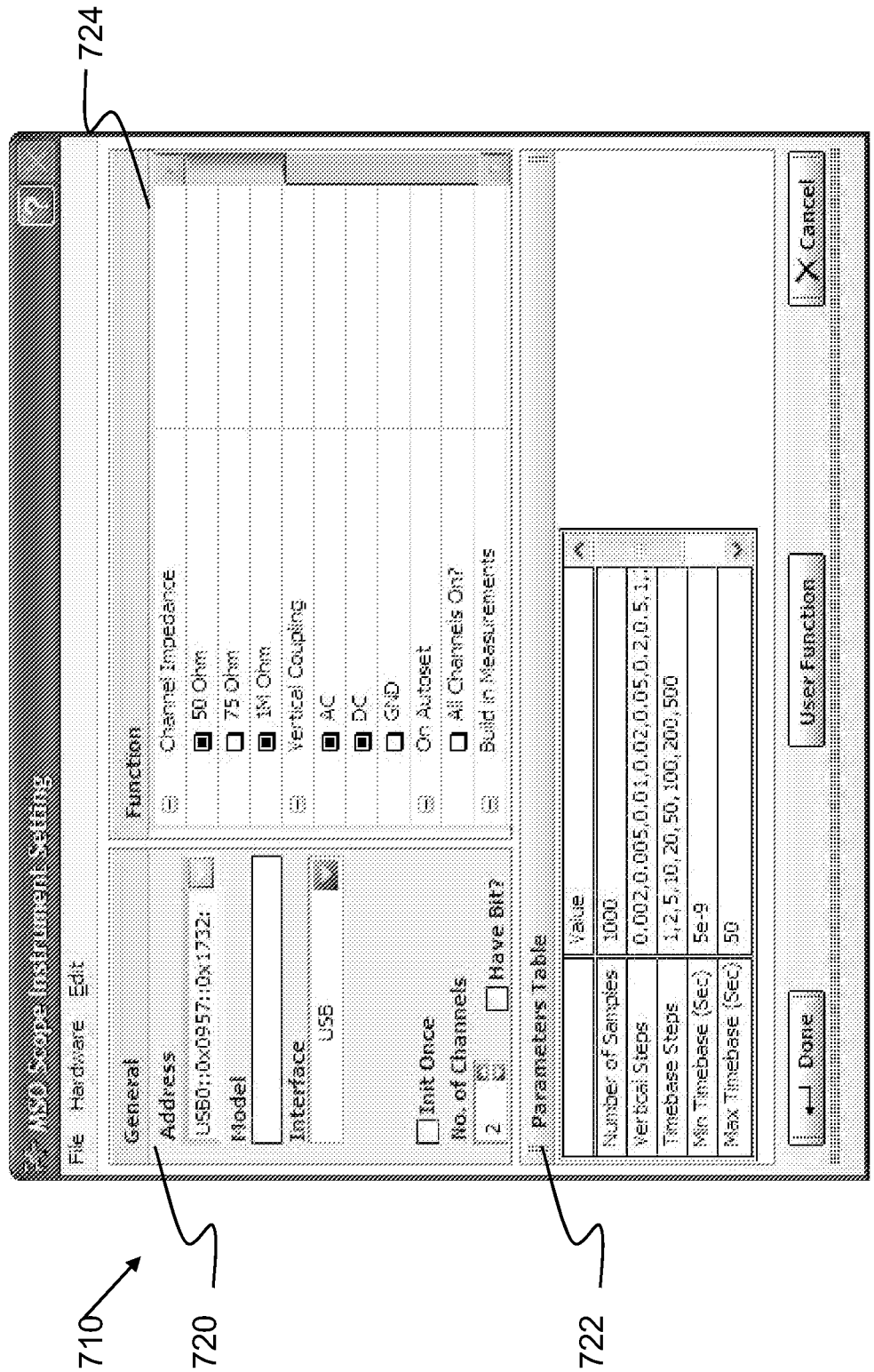

FIG. 7A-C depicts further screen shots of the system and method according to the present invention. FIG. 7A provides a further depiction of the configuration stages described in FIG. 2. User interface 620 comprises a plurality of menus for example including but not limited to logic name (702), attribute selection (704), family type (706), driver (708), instrumental setting (710) and data links (712), or the like. For example, attributes menu 704 define attributes of the testing equipment for example including but not limited to attribute names and corresponding values. For example, a driver for the specific equipment is defined through driver menu 708. FIG. 7B provides a closer depiction of attribute menu 704 wherein attributes are preferably chosen form an attribute library 714 used to compile and define an attribute table 716. Optionally, attribute user interface 724 provides a user with the option of defining a common denominator and linking tool that may optionally and preferably link and coordinate use and access to different equipment optionally at remote locations. Optionally, equipment connected remotely may be connected through a network connection for example including but not limited to an internet or intranet connection according to network configuration as is known and accepted in the art.

Optionally, defining a common denominator using interface 724 provides a user with the ability to utilize a plurality of testing equipment and or software modules available to different UUTs executing the same testing sequence. Optionally, a user defines at least one or more equipment attributes, parameters, capabilities, hardware interface, hardware connection, location, logic, testing requirements or the like that must be present to allow for the testing sequence to be executed with the equipment and UUT. Optionally and preferably the system and method of the present invention provides for the automatic identification of functionally equivalent or similarly defined test equipment relative to a UUT and the test sequence, therein saving available testing resources.

FIG. 7C provide a closer depiction of instrumental setting menu 710 wherein a user preferably defined the instrument setting required for a building block, 411 within sequence 420 of FIG. 4A of 4B. Most preferably, general settings options 720 for example comprising general data for example including but not limited to device address, model and connection interface is configured and set by a user. Preferably, instrumentation parameters table setting 722 are preferably compiled by a user. Optionally, parameter limitations for example may include but are not limited to allowable minimum and maximum values. Instrumentation functionality is controllably set with function menu 724, to defined functions, parameters related to the specific instrumentation being defined for the specific building block.

While the invention has been described with respect to a limited number of embodiments, it will be appreciated that many variations, modifications and other applications of the invention may be made.

What is claimed is:

1. A computer implemented method for defining and implementing a testing sequence for a UUT (unit under test) using directly controllable modular building blocks on a graphical user interface defining a test sequencing platform wherein said sequencing platform alleviates the need to manually connect said modular blocks, the method comprising:
   a. abstracting hardware test requirements for a UUT;
   b. defining a plurality of modular building blocks to correspond to said hardware test requirements, wherein each of said modular building blocks defines an elementary graphical unit utilized to configure a step within said hardware test requirement;
   c. building said test sequence by the user by placing said plurality of modular building blocks on said sequencing platform, said platform defining a graphical interface displayed to the user wherein said building blocks may be manipulated by the user, said platform comprising a plurality of cells defining a matrix platform provided for placing said building blocks and for forming a relative stacking order of said building blocks on said platform wherein said stacking order corresponds to said hardware test sequence requirements and wherein said platform automatically links said building blocks according to said stacking order determining the flow and execution of said test sequence according to said hardware test requirements; wherein said stacking order may be edited by a user within said platform such that said platform automatically re-links and reconfigures the flow and execution of said test sequence; and
   d. executing said test sequence according to the relative location of said plurality of modular building blocks on said matrix platform.

2. The method of claim 1 wherein said plurality of said modular building blocks are chosen from a library of pre-defined modular blocks.

3. The method of claim 1 wherein said building blocks are chosen from the group consisting of:
   a. logic test sequences building blocks comprising test sequences chosen from the group consisting of: parallel process, start, case block, loop block, while, wait for event, delay, terminate, set event, end, analysis, criteria, paraloop, if then, conditional, group, and lock & unlock; or
   b. test & measurements equipment building blocks comprising test sequences chosen from the group consisting of: oscilloscope, spectrum analyzer, Geiger counter, voltmeter, decibel meter, odometer, tachometer, pressure meter, flow meter, DC power, AC power, analog I/O, attenuators, audio analyzers, camera, chamber, communication, counter, data transmission, digital I/O, digital wave, electronic load, function generator, multimeter, network analyzer, power meter, power supply, pulse pattern generator, scope, signal generator, sound, spectrum, switch, mobile, traffic generator, or any combination thereof.

4. The library of claim 2 comprising categorized, or grouped, or favorite or often used building blocks.

5. The method of claim 1 for testing process automation or resource management using said directly controllable modular building blocks.

6. The method of claim 5 wherein said resource management comprises synchronization and coordination between different test sequences and wherein said resource management comprises defining resource attributes required to execute a test sequence on a given UUT forming a common denominator attributes specific to said resource.

7. The method of claim 6 wherein said resource management test sequences are chosen from the group consisting of test equipment, hardware.

8. The matrix of claim 1 wherein the size of said matrix is user defined.

9. The sequencing platform of claim 1 wherein said modular building blocks are placed over and controllably associate with said cells.

10. The sequencing platform of claim 1 wherein said building blocks provide a platform for creating fluid test sequences chosen from the group consisting of splitting, branching, delayed process, parallel process, between process and within a process.

11. The method of claim 1 wherein said modular building blocks correspond to at least one process undertaken during said test sequence.

12. The modular building block of claim 3 wherein said Test and Measurement (T&M) modular building blocks are configured to automatically comprise the relevant analytical procedure according to a product and/or process under test.

13. The modular building blocks of claim 3 wherein said building blocks may be customized according to at least one user defined parameters chosen from the group consisting of: relevant equipment type, equipment family, vendor, vendor driver, specific functionality required and hardware interface.

14. The method of claim 1 wherein test sequences, modular building blocks, or building block sequences may be exported to a third party system through a computer readable media; and wherein said export is facilitated by running a generated code that may be run on an appropriate programming language or script interface chosen from the group consisting of C, C++, object oriented language, markup language, TCL and XML.

15. The method of 3 wherein said conditional building blocks are implemented with at least two building blocks wherein a first modular building block defines an event condition and a second modular building block to wait for the event condition to exist.

16. A computer aided design (CAD) system having a processor for evaluating and testing products and processes under evaluation with modular building blocks comprising:
   a. a functional testing module for abstracting an evaluation and test sequences for evaluating products and/or processes; and
   b. a test execution module for executing and performing said evaluation and test sequences abstracted with said function testing module; and
   c. a requirements module for defining requirements for said evaluation and test sequences associated with said products and processes; and
   d. a standards module for standardizing data exchange, communication and storage within said CAD system; and e. a product and process description module providing product and process description for abstracting said evaluation and test sequence with said function testing module; and f. an encapsulation module providing modular building blocks for abstracting said evaluation and test sequences for said products and/or processes with said test execution module and in accordance with said product and process description module and further based on requirements defined in said requirements module.

17. The system of claim 16 wherein said CAD system further comprises:

g. a business intelligence module for analyzing said testing and evaluation of said products and processes with respect to an organization; and h. a data evaluation module for providing said business intelligence module with data for said analysis; and i. an enterprise processes module comprising user and/or enterprise based protocols providing for initiating the execution of sequences created by said functional testing module and provided to at least one or more management tools.

18. The system of claim 16 wherein said standards module comprising at least one and more preferably a plurality of standard engines to provide a user with standardized data exchange and storage for said CAD system, chosen from the group consisting of standard reporting and documentation engine, standard communication engine and standard data engine; and wherein said standardized communication engine is provided with a plurality of communication formats chosen from the group consisting of user defined standards, company standards, regional standards, local standards, international standards, BVQI, ISO.

19. The system of claim 16 further comprising analysis module providing decision support associated with implementing and extrapolating solutions with respect to the results of said product and processes evaluation and test.

20. The method of claim 1 further comprising abstracting software test requirements and defining said modular building blocks to correspond to said software test requirements.

21. The method of claim 20 wherein said building blocks comprising said software test requirements are chosen from the group consisting of:

a. software test sequences building blocks comprising test sequences chosen from the group consisting of: exe, .net dll, Win32 dll, activex, webservices, python, Java script, vb script, perl, tcl and batch; or b. communication protocols building blocks chosen from the group consisting of: serial, TCPIP, UDP, Telnet, GPIB, USB, FTP, parallel, Web GUI, Web services, FTP, BUS, TFTP5MAIL, CLI, SNMP, SSH, HTTP, Application GUI; or c. administrative utilities comprising test sequences chosen from the group consisting of: File Engine, MatShell, and Transformation; or d. third party API; or e. reporting tools.

22. A computer implemented method for defining and implementing a testing sequence for a UUT (unit under test) using directly controllable modular building blocks on a graphical user interface defining a test sequencing platform wherein said sequencing platform alleviates the need to manually connect said modular blocks, the method comprising:

a. abstracting software test requirements for a UUT;

b. defining a plurality of modular building blocks to correspond to said software test requirements, wherein each of said modular building blocks defines an elementary graphical unit utilized to configure a step within said software test requirement;

c. building said test sequence by the user by placing said plurality of modular building blocks on said sequencing platform, said platform defining a graphical interface displayed to the user wherein said building blocks may be manipulated by the user, said platform comprising a plurality of cells defining a matrix platform provided for placing said building blocks and for forming a relative stacking order of said building blocks on said platform wherein said stacking order corresponds to said software test sequence requirements and wherein said platform automatically links said building blocks according to said stacking order determining the flow and execution of said test sequence according to said software test requirements; wherein said stacking order may be edited by a user within said platform such that said platform automatically re-links and reconfigures the flow and execution of said test sequence; and d. executing said test sequence according to the relative location of said plurality of modular building blocks on said matrix platform.

23. The method of claim 22 further comprising abstracting hardware test requirements and defining said modular building blocks to correspond to said hardware test requirements.

24. The method of claim 23 wherein said building blocks comprising said hardware test requirements are chosen from the group consisting of:

a. software test sequences building blocks comprising test sequences chosen from the group consisting of: exe, .net dll, Win32 dll, activex, webservices, python, Java script, vb script, perl, tcl and batch; or b. communication protocols building blocks chosen from the group consisting of: serial, TCPIP, UDP, Telnet, GPIB, USB, FTP, parallel, Web GUI, Web services, FTP, BUS, TFTP5MAIL, CLI, SNMP, SSH, HTTP, Application GUI; or c. administrative utilities comprising test sequences chosen from the group consisting of: File Engine, MatShell, and Transformation; or d. third party API; or e. reporting tools.

* * * * *